EFFECT OF WATER ADDITION ON HYDROCRACKING ACTIVITY OF RARE EARTH CONTAINING CATALYST

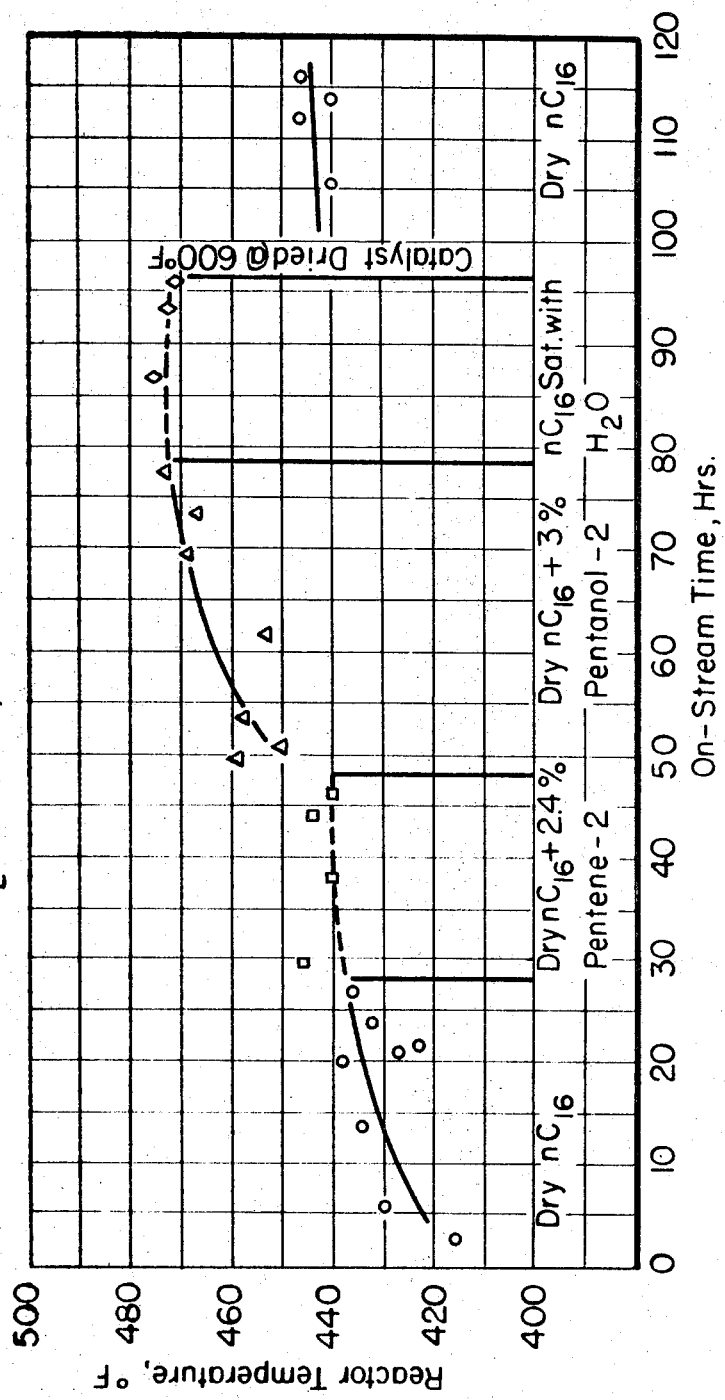

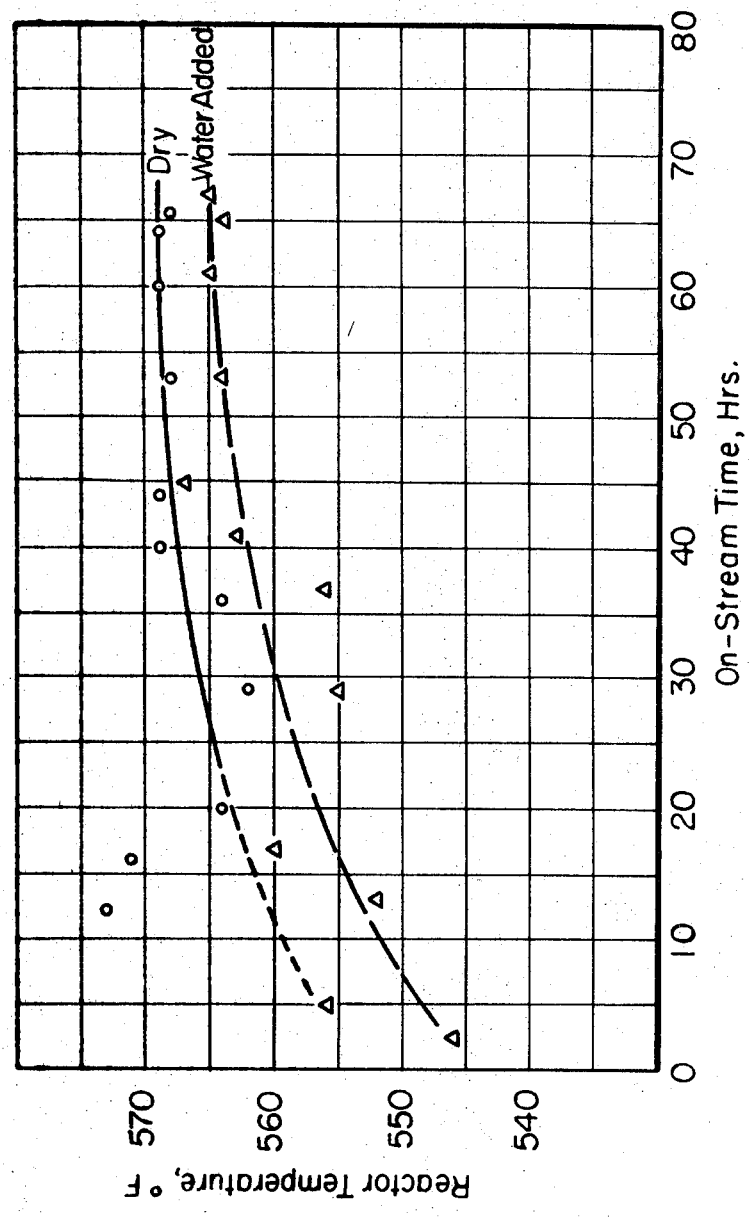

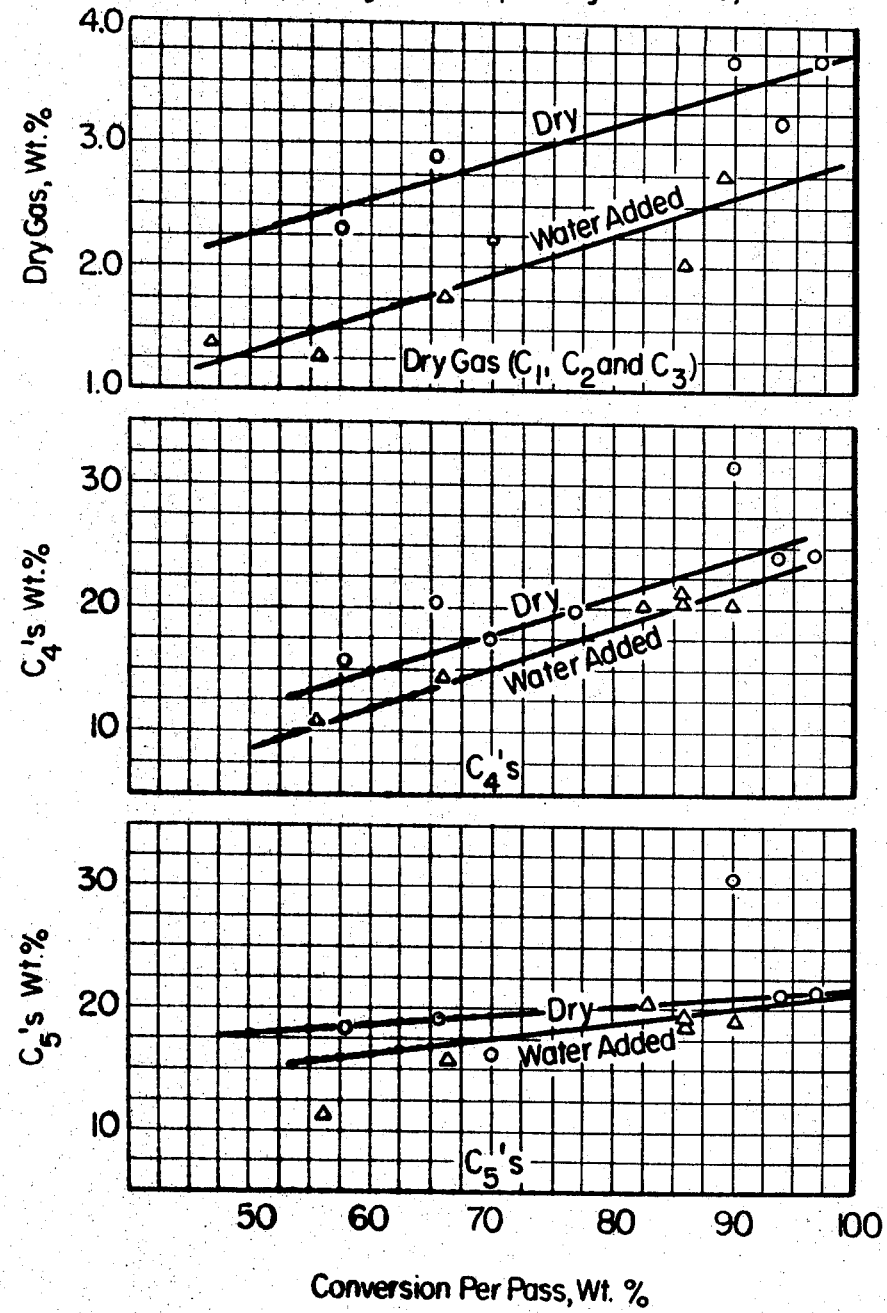

United States Patent Office 3,546,100
Patented Dec. 8, 1970

3,546,100
HYDROCRACKING ACTIVITY AND SELECTIVITY
OF A RARE EARTH CRYSTALLINE ZEOLITE
Tsoung-Yuan Yan, Pitman, N.J., assignor to Mobil Oil
Corporation, a corporation of New York
Filed Oct. 30, 1968, Ser. No. 771,823
Int. Cl. C10g 13/04
U.S. Cl. 208—111      1 Claim

ABSTRACT OF THE DISCLOSURE

A rare earth exchanged crystalline aluminosilicate hydrocracking catalyst may be improved with respect to its cracking activity and selectivity by using water in controlled amounts to activate the catalyst cracking sites.

BACKGROUND OF THE INVENTION

The catalytic cracking of hydrocarbons has been practiced by contacting a hydrocarbon charge in the vapor liquid or mixed vapor liquid state in the presence of hydrogen with a catalytic agent having hydrogenation-dehydrogenation activity in combination with cracking activity under conditions of temperature, pressure and contact time to achieve a substantial conversion of the hydrocarbon charge to lower boiling products including gasoline, jet fuels, and lubricating oil materials. Hydrocracking reactions are generally high pressure exothermic reactions requiring means for removing and controlling heat generated in the high pressure zones. Furthermore, hydrocracking reactors are designed to operate within relatively limited conditions and conversion is therefore controlled and maintained as the catalyst ages by gradually increasing the reactor temperatures.

During the hydrocracking operation and conversion of high boiling materials to lower boiling materials, a carbonaceous material is laid down on the catalyst as ever increasing operating conditions are employed to compensate for catalyst activity-selectivity loss. This carbonaceous material commonly referred to as coke impairs catalyst efficiency and activity thus requiring regeneration of the catalyst at periodic intervals to restore its activiy and selectivity.

One method for improving the reactor catalyst conversion on-stream time resides in the type of catalyst selected for use therein. Another method resides in the use of ammonia to suppress an initially high activity catalyst. Thus it has been suggested to employ as hydrocracking catalyst, catalysts comprising high activity crystalline zeolites employing one or more various elements of the Periodic Table in combination therewith. A crystalline aluminosilicate zeolite particularly of the faujasite type having an effective pore diameter in the range of 6 to 15 angstroms is satisfactory for use in hydrocracking catalysts.

When hydrocracking with these very active hydrocracking catalysts, the selectivity and catalyst activity is greatly affected by the reaction temperature. Furthermore, the catalyst activity and selectivity are considerably affected by change of on-stream time. Thus, in a hydrocracking operation, it is particularly important to maintain catalyst selectivity as the catalyst activity changes with on-stream time over an extended period of operation.

SUMMARY OF THE INVENTION

The present invention is particularly concerned with improving the activity and particularly the selectivity of rare earth exchanged crystalline aluminosilicates used as hydrocracking catalysts.

In a hydrocracking operation some water is usually found present in the reactor. This water comes from several sources which can be identified as (1) conversion of oxygenated compounds in the charge stock, (2) water dissolved in the charge stock and (3) water picked up by recycled gas in the recycled gas scrubbers. The water thus found in the hydrocracking operation can be monitored, controlled and limited substantially as desired in modern technology. The limited use of water as a catalyst activator in a hydrocracking operation is the essence of this invention. In a more particular aspect, an object of this invention is to identify for others the effect of water or materials which convert to and form water on the hydrocracking of hydrocarbons such as, for example, n-hexadecane or a hydrocarbon charge comprising a gas oil or a blend of gas oils using a rare earth exchanged crystalline zeolite material.

It has been found as herein shown that water addition in limited or selected amounts to a hydrocracking operation whether separately or in admixture with the hydrocarbon charge or with the hydrogen recycled gas can be an effective catalyst activator for rare earth exchanged crystalline zeolites and particularly for the rare earth exchanged crystalline aluminosilicates of X and Y crystal structure. That is, it has been found that when a specifically controlled amount of water selected to maintain from about 10 to about 130 mm. water vapor partial pressure is brought in contact with a rare earth exchanged crystalline aluminosilicate during a hydrocracking operation that such a water vapor partial pressure will operate to significantly improve the selectivity of the crystalline zeolite catalyst at substantially any activity level and thus permit extending the catalyst on-stream life, rather than reduce its selectivity-activity level as heretofore thought.

The hydrocracking operation is employed for many purposes including the cracking of high and low boiling hydrocarbon fractions such as distillate fractions boiling above about 300° F. and more usually those fractions boiling above about 400° F. and having an end boiling point as high as 900–1000° F. Hydrocarbon feeds including virgin gas oils, coker gas oils, cycle stocks and combinations thereof boiling in the range of 400–900° F. are often employed in hydrocracking operations for conversion to gasoline and jet fuel products. The hydrocracking operation is generally carried out at a temperature selected from within the range of from about 400° F. to about 1000° F. but more usually the reaction temperature is selected from within the range of 500° F. to about 850° F. The hydrogen pressure in such an operation may be substantially any pressure selected from within the range of about 100 to about 3000 p.s.i.g. but preferably pressures are selected at the lowest value within this range which will permit one to obtain the conversion and the product selectivity desired for a suitable catalyst on-stream life. The liquid hourly space velocity selected for hydrocracking is most usually selected from within the range of 0.1 to 10 and the molar ratio of hydrogen to hydrocarbon charge is maintained as low as possible in the range of 2 to about 80 and more usually in the range of from about 5 to about 50. There is a net consumption of hydrogen during the hydrocracking operation and this consumption is dependent upon feed composition, severity of conversion and the olefin and aromatic materials encountered in the operation. Hydrogen consumption within the range of 500 to 3000 s.c.f./b. (standard cubic feet/barrel) are not unusual and are to be expected. Reaction temperature may also vary considerably for a given conversion level and may be expected by virtue of this invention to be from about 5 to about 60° F. lower but more usually from about 10 to about 25° F. lower than would be normally experienced when hydrocracking with other types of hydrocracking catalysts without the benefit of applicant's contribution. Thus by the present invention the activity of rare earth exchanged zeolites are significantly increased by operating in an atmosphere of limited moisture content. Such an activity increase permits a decrease in operating temperature to achieve a given conversion level. It has been found further that maintaining a moist atmosphere as described herein is particularly effective for improving the catalyst selectivity by reducing light ends production. That is, the production of $C_1$–$C_4$ hydrocarbons was found to be significantly reduced.

The hydrogenation-dehydrogenation component or components which may be admixed with the rare earth exchanged crystalline aluminosilicates include metal oxides and sulfides of metals of the Periodic Table which fall in Group VI–A including chromium, molybdenum, tungsten and the like and Group VIII metals including cobalt, nickel, platinum, palladium, rhodium and the like and combinations of metal sulfides and oxides of the metals of Groups VI and VIII such as nickel, tungsten, sulfide, cobalt, molybdenum, oxides and the like and hydrogenating components can be used in amounts ranging from 0.1 to about 10 and as high as 20 weight percent based upon the hydrocracking catalyst.

Particularly suitable hydrocracking catalysts employed in the method of this invention are the large pore crystalline aluminosilicates such as faujasite zeolites which are promoted with one or more platinum group metals and which have been prepared under conditions so as to contain after base exchange no more than about 5 percent sodium calculated as $Na_2O$ and preferably no more than 1 or 2 percent of sodium.

BRIEF DESCRIPTION OF THE DRAWINGS

FIG. 2 shows diagrammatically the effect of water addition on the hydrocracking activity of an acid Y type of crystalline aluminosilicate.

FIG. 3 shows diagrammatically the effect of water addition on catalyst activity for hydrocracking a blend of gas oils identified as H blend using a palladium promoted rare earth exchanged crystalline aluminosilicate.

FIG. 4 shows diagrammatically the effect of water addition on product selectivity when hydrocracking H blend using a platinum promoted rare earth exchanged crystalline aluminosilicate.

DESCRIPTION OF SPECIFIC EMBODIMENTS

Figure 1:
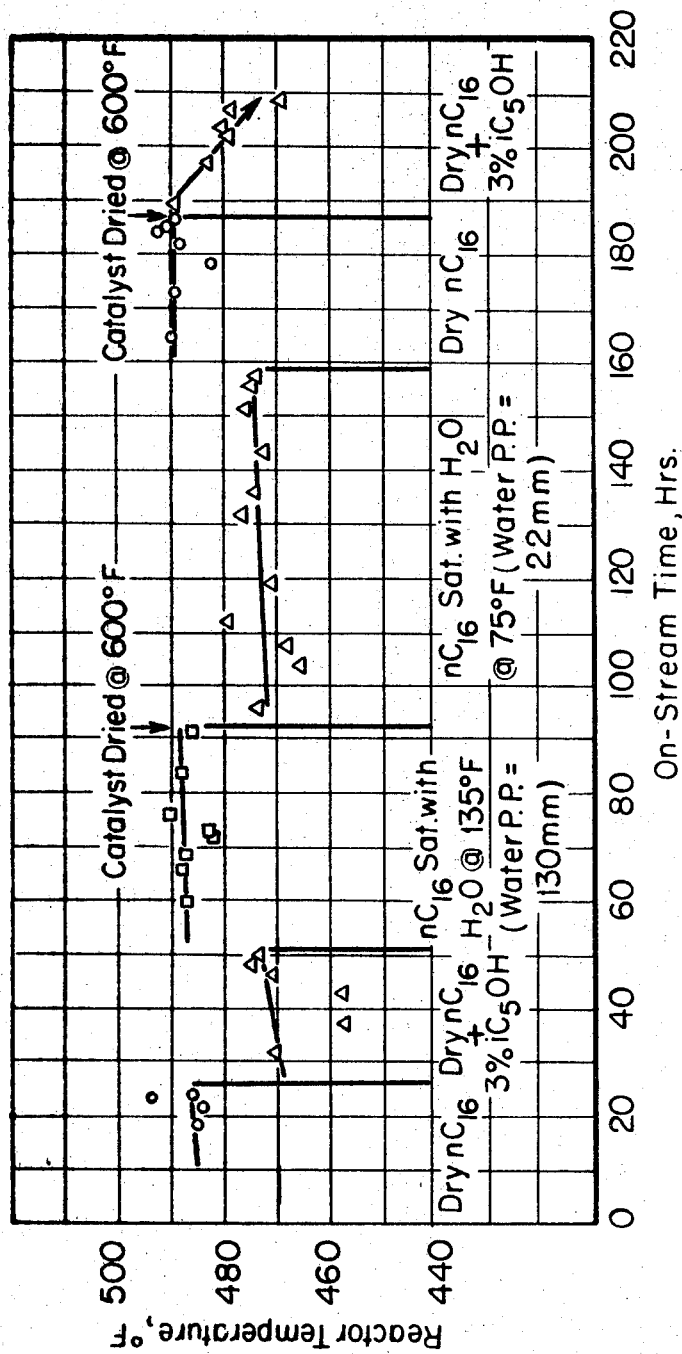
FIG. 1 shows diagrammatically the effect of water addition on the hydrocracking activity of a rare earth exchanged crystalline aluminosilicate promoted with palladium which was on-stream for about 220 hours.

Two different catalysts designated Catalyst A and Catalyst B were prepared as follows:

Catalyst A, a palladium promoted rare earth exchanged zeolite X crystalline aluminosilicate, was prepared by impregnating a rare earth exchanged zeolite X material containing about 0.8% sodium to provide 1% of palladium using $PdCl_2$ in a hydrogen chloride solution. The impregnated material was dried quickly and then calcined with air at 1000° F.

Catalyst B is a platinum promoted hydrogen exchanged zeolite Y crystalline structure such as defined in U.S. Pat. 3,130,007 and was prepared by impregnating the hydrogen exchanged zeolite Y material with $Na_2PtCl_6$ to provide 2.5 wt. percent platinum combined therewith and the mixture was allowed to wet age. Thereafter the platinum impregnated zeolite Y was reduced with hydrogen at a temperature of about 900° F.

A commercially pure grade of n-hexadecane hydrocarbon was used in one example as the hydrocarbon charge material. The n-hexadecane was used as received or it was dried prior to use by passing it in contact with a 4A molecular sieve material and subsequently filtered as required. Another charge stock investigated was a blend of gas oils herein identified as H blend and comprising a virgin gas oil, a coker gas oil and cycle stock obtained from a catalytic cracking operation. The properties of this H blend of gas oils are shown in Table 1 presented hereinafter.

TABLE 1.—PROPERTIES OF HYDROCRACKER FEED H BLEND

|  | Raw | Pretreated |
|---|---|---|
| Gravity, ° API | 19.0 | 31.3 |
| Aniline number, ° F | 131.4 | 151.8 |
| Sulfur, p.p.m | 1,100 | 35 |
| Nitrogen, p.p.m | 710 | <0.5 |
| Hydrogen, wt. percent | 10.69 | 12.36 |
| Distillation VA (10 mm.): | | |
| IBP | 388 | 327 |
| 10 | 528 | 467 |
| 30 | 614 | 550 |
| 50 | 688 | 611 |
| 70 | 735 | 669 |
| 90 | 802 | 751 |
| EP | 832 | 803 |
| Recovery, percent | 95.0 | 98.0 |
| Drum No | J6128 | J6337 |

|  | Vol. percent | Wt. percent |
|---|---|---|
| Source of raw feed: | | |
| Light Coker | 20.4 | 18.9 |
| Heavy Coker | 12.4 | 12.2 |
| Light TCC | 19.3 | 18.4 |
| Heavy TCC & Furfural Extract | 47.9 | 50.5 |
| Total | 100.0 | 100.0 |

Test operating procedure

Ten ml. of catalyst were charged to a flow through reactor and pressured up to the unit pressure herein identified. With hydrogen flowing through the reactor, the reactor was heated to about 300° F. and the oil pump was then started. The experiment was conducted with single pass operation. About 60% conversion was maintained by adjusting the reactor temperature. The rest of the process parameters are listed below:

| Charge stock | n-Hexadecane | Beaumont H blend |
|---|---|---|
| Pressure, p.s.i. | 500 | 1,500 |
| LHSV, v./v./hr | 1.0 | 1.0 |
| $H_2$ circulation rate, s.c.f./b | ~7,500 | 7,500 |

A high pressure water bubbler was installed in the hydrogen gas line and was controlled at a given temperature to control the water content of the hydrogen stream passed to the reactor. A by-pass line around the water bubbler was installed so that dry hydrogen gas could be used in place of moisture laden hydrogen rich gas.

The data obtained which identify the concept of the invention herein defined are diagrammatically presented in FIGS. 1 through 4. The activities of Pd/REX and Pt/HY crystalline aluminosilicate hydrocracking catalyst for hydrocracking dry n-hexadecane are shown in FIGS. 1 and 2. In the figures the reactor temperatures required for a conversion level of 60% are plotted against the on-stream time. The temperature required for effecting such an operation lined out at 486° F. and 440° F. for the Pd/REX and Pt/HY catalyst, respectively. This temperature difference was somewhat expected since the Pt/HY catalyst had a much more active cracking base than the Pd/REX.

Activation of Pd/REX catalyst by I-pentanol

After the catalyst was lined out with dry n-hexadecane ($n$-$C_{16}$), 3 wt. percent of i-pentanol was added to the charge stock. The catalyst activity was improved by this addition and the temperature required for 60% conversion was lowered to 473° F. as compared to 486° F. under dry operations as shown in FIG. 1. This temperature reduction improvement translates to a rate constant improvement of about 50%. However, since i-pentanol is easily converted to pentene and water, it is thus necessary to determine whether pentene or water is the activator. Referring now to FIG. 1, it can be seen that after 50 hours of operation, the addition of i-pentanol was stopped and water was added (130 mm. partial pressure) by saturating the hydrogen stream passed to the reactor. With this water addition, it was observed that the catalyst activity was about the same as that observed when dry n-hexadecane was charged to the reactor. Thus the water concentration was too high. Thereafter the catalyst was dried in situ by cutting off the feed passed to the reactor and raising the reactor temperature to 600° F. for 5 hours. After drying the catalyst under these conditions, the water content of the hydrogen gas was adjusted to 22 mm. partial pressure ($2.5 \times 10^{-2}$ mole percent of water) and the n-hexadecane charge was passed over the catalyst again. As shown in FIG. 1, the catalyst activity lined out again at 473° F. as it had previously done when i-pentanol was in the charge to the reactor. Thus, it was established that water rather than pentene was the activator. This conclusion was further supported by the fact that the catalyst activity gained by water addition was lost by drying the catalyst. This comparison can be observed by referring to the 90–160 and the 160–180 hours on-stream periods shown in FIG. 1.

Effect of I-pentanol (water) on product yields from Pd/REX

The product yields obtained under hydrocracking conditions with and without the addition of i-pentanol are therefore postulated that the catalyst was deactivated because competition exists between the water and hydrocarbon for the surface and hydration of protonic sites. The effect of the water addition was also found to be reversible, that is, the promotional effect obtained by the addition of water to the Pd/REX catalyst was lost by drying the catalyst at 600° F. with hydrogen for 5 hours. Conversely, it was found that the addition of water effectively deactivated the Pt/HY catalyst and its activity was restored when dried (see FIG. 2).

Effect of water on H blend hydrocracking

The hydrocracking activities of the Pt/REX catalyst using as a charge the H blend hereinbefore identified under wet and dry conditions are shown in FIG. 3. It is to be observed that the activity of the catalyst with water addition was consistently higher than without the water addition even though the effect is not quite as dramatic as that observed with n-hexadecane as the feed. Table 2 provides the data obtained for hydrocracking the H blend feed with and without water addition and the product yields obtained in the runs. In this example, selectivity percent is defined as product weight percent divided by conversion (of 390° F.+ material) weight percent. The selectivity of product obtained depends considerably on the conversion level. For ease of comparison, the selectivities for dry gas, $C_4$'s and $C_5$'s are plotted in FIG. 4 as TABLE 2.—EFFECT OF WATER ON HYDROCRACKING OF H BLEND
[Catalyst: Pd/REX; pressure, p.s.i.: 1,500; LHSV, v./v./hr.: 1.0]

| Run No. CT 137- | 140 | 140 | 140 | 141 | 141 | 142 | 142 | 143 | 144 |
|---|---|---|---|---|---|---|---|---|---|
| On-stream time, hrs | 44.5 | 52.5 | 68.5 | 92 | 116 | 164 | 191 | 210 | 234 |
| Temperature, °F | 562 | 578 | 576 | 630 | 612 | 628 | 637 | 638 | |
| Water bath temperature, °F | 60 | 60 | 60 | | | 60 | 60 | | 150 |
| Mm. Hg $H_2O$ | 13 | 13 | 13 | | | 13 | 13 | | (191) |
| V. percent of $H_2O$ | (1) | (1) | (1) | | | (1) | (1) | | (2) |
| Conversion 380° F., V. percent | 55.6 | 82.1 | 65.8 | 93.7 | 57.6 | 85.7 | 88.9 | 96.9 | 85.5 |
| Product yield, wt. percent: | | | | | | | | | |
| $C_1$-$C_3$ | 0.7 | 1.3 | 1.2 | 3.0 | 1.3 | 1.8 | 2.5 | 3.6 | 2.9 |
| $C_4$ | 6.0 | 16.7 | 9.7 | 22.6 | 8.9 | 17.5 | 18.3 | 23.9 | 18.3 |
| $C_5$ | 6.6 | 17.2 | 10.7 | 20.5 | 10.4 | 16.6 | 17.6 | 21.5 | 16.4 |
| 125–180° F | 3.7 | 5.5 | 4.2 | 12.5 | 2.9 | 5.0 | 9.3 | 10.9 | 6.0 |
| 180–380° F | 40.9 | 44.4 | 42.9 | 38.2 | 36.9 | 47.8 | 44.2 | 40.1 | 45.0 |
| 380+ ° F | 43.5 | 17.2 | 33.2 | 6.1 | 41.3 | 13.8 | 10.7 | 3.0 | 14.0 |
| Total | 101.4 | 102.3 | 101.9 | 102.8 | 101.7 | 102.5 | 102.5 | 103.0 | 102.6 |
| Selectivity, wt. percent: | | | | | | | | | |
| $C_1$-$C_3$ | 1.3 | 1.6 | 1.8 | 3.2 | 2.3 | 2.1 | 2.8 | 3.7 | 3.4 |
| $C_4$ | 10.8 | 20.3 | 14.7 | 24.2 | 15.4 | 20.4 | 20.5 | 24.6 | 21.4 |
| $C_5$ | 11.9 | 20.9 | 16.3 | 21.9 | 18.0 | 19.4 | 19.7 | 22.2 | 19.2 |
| 125–180° F | 6.7 | 6.7 | 6.4 | 13.3 | 5.1 | 5.8 | 10.4 | 11.2 | 7.1 |
| 180–380° F | 73.5 | 54.0 | 65.2 | 40.8 | 64.1 | 54.8 | 49.6 | 41.3 | 52.6 |

[1] $1.7 \times 10^{-2}$.
[2] $2.5 \times 10^{-1}$.

shown in Table 1 presented above. It is to be observed from these data that (a) the addition of i-pentanol increased the I/N ratio of the cracked products, i.e. the isomerization activity of the catalyst was definitely enhanced by the addition of i-pentanol and (b) the yield of $C_4$ and lighter products seems to have been suppressed by the addition of i-pentanol. This same observation was made during the hydrocracking of the H blend as will be discussed later. To further establish identification of the cracked activator of the hydrocracking process above-described, pentene-2 was added to the small n-hexadecane charge and thereafter was hydrocracked in the presence of a Pt/HY (the acid form of zeolite Y such as described in U.S. Pat. 3,130,007) promoted with platinum hydrocracking catalyst after it had been onstream and lined out with dry n-hexadecane as the charge. As shown in FIG. 2, no promotional effect was found in this operation. On the other hand, FIG. 2 shows that the Pt/HY (platinum promoted acid Y zeolites) catalyst was deactivated about 30° F. (from 440 to 470° F.) when isopentanol was added to maintain a given conversion level. It was also found that the same lower catalyst activity was maintained at 470° F. when water was added instead of i-pentanol. It is a function of conversion level. It is to be observed that the dry gas and the $C_4$ yields were considerably suppressed by water addition. Therefore, since the yield of $C_5$'s was about the same in all cases, the reduced yields of dry gas and $C_4$'s resulted in an increase in the yield of $C_6+$ gasoline product. From an economic standpoint, it must be concluded, therefore, that the effect of water addition on product yield is a significant factor.

I have now demonstrated by the above examples that the controlled addition of water is beneficial for Pd/REX catalysts but is detrimental for Pt/HY catalysts. Furthermore, I have demonstrated that besides having a beneficial effect on activity and product selectivity, the control of the water content in a system employing rare earth exchanged crystalline zeolite may be effectively employed for reducing the catalyst aging rate and for controlling the initial catalyst activity to reduce undesired, rapid coking on start-up of such a hydrocracking operation.

Having thus provided a general discussion of the improved method for hydrocracking hydrocarbon-charged materials in the presence of the specific crystalline zeolite catalysts and presented specific examples in support thereof, it is to be understood that no undue restrictions are to be imposed by reason thereof except as defined by the following claim.

I claim:

1. In a process for hydrocracking hydrocarbons at a temperature in the range of 400° F. to 1000° F. at elevated pressures up to about 3000 p.s.i.g., the method for maintaining the selectivity of a rare earth crystalline aluminosilicate hydrocracking catalyst as it loses activity during the conversion of hydrocarbons which comprises restricting the partial pressure of water in contact with said hydrocracking catalyst during said hydrocarbon conversion to within the range of 10 to 130 mm.

References Cited

UNITED STATES PATENTS 3,407,148  10/1968  Eastwood et al. _____ 252—455

DELBERT E. GANTZ, Primary Examiner

A. RIMENS, Assistant Examiner

U.S. Cl. X.R.

208—120; 252—455